Oct. 8, 1946.   C. HUSSMAN   2,408,856
VIBRATION ABSORBING SUPPORT
Filed May 18, 1944

INVENTOR.
CARL HUSSMAN
BY
Sheridan, Davis & Cargill Attys.

Patented Oct. 8, 1946

2,408,856

UNITED STATES PATENT OFFICE 2,408,856

VIBRATION ABSORBING SUPPORT

Carl Hussman, Chicago, Ill.

Application May 18, 1944, Serial No. 536,075

3 Claims. (Cl. 248—22)

This invention relates to improvements in vibration absorbing supports for machines.

Fibrous cushioning material, such as felt, has been employed beneath machines for absorbing vibrations and noises incident to the operation of the machines, but such fibrous sheet material generally has been laid flat upon a supporting surface and being quite readily compressible and of a limited resilience, has soon become highly densified under the imposed loads. The densification of felt or like material beyond its elastic limit, or to an extent where it cannot further be compressed freely and will not readily spring back when relieved of compressive forces, impairs or destroys its vibration absorbing characteristics. The degree of densification of felt under a given load is reduced by increasing the thickness of the felt, but adequately to cushion some machines by practices heretofore employed, would require a thickness of felt such as would render the use of such material prohibitive.

One object of the present invention is to provide a vibration absorbing structure for machines comprising felt strips or like fibrous material whereby an effective thickness substantially greater than the thickness of the felt sheet from which the strips are formed, as well as an added resilience imparted to the felt, are utilized in absorbing vibrations from the machine, whereby substantially less felt material need be employed than is required by prior practices for effectually damping mechanical vibrations and noises incident to the operation of a given machine.

Another object of the invention is to provide an improved vibration absorbing support for machines comprising fibrous strips arranged for edgewise compression under the imposed loads and means cooperating with the strips for reducing side sway during operation of the machines.

Further objects and advantages of the improvements will be apparent from a consideration of the following specification and accompanying drawing wherein.

Figure 1:
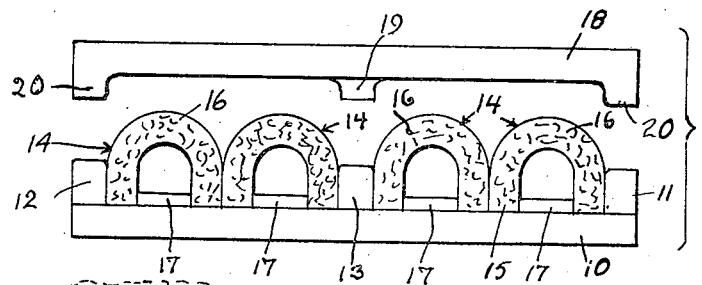
Figure 1 is a side elevation of a vibration absorbing support for a machine illustrative of the present invention, a machine base or upper plate of the support being shown out of supported relation.

In the drawing, 10 indicates a bottom plate or base of the improved anti-vibration or vibration absorbing structure, the plate having similar end flanges 11 and 12 which may be integral with the plate or secured thereto by any approved means. In the particular form of support shown in the drawing a stabilizing bar or rib 13 is shown extending parallel to the flanges 11 and 12 and disposed midway between the same. In the particular embodiment of the improvements illustrated, two strips 14 of vibration absorbing material such as felt are disposed between the flange 11 and the stabilizer strip 13 and two similar strips 14 are disposed between the flange 12 and stabilizer 13. Each of the strips 14 is flexed or folded longitudinally to an inverted U-shape, as viewed in end elevation, to provide legs 15 and an integral connecting arch portion 16, which is initially bowed upwardly, as shown in Figure 1. Between the pair of legs of each strip, is positioned a spacer member 17 upon the base 10, the members 17 being coextensive in length with the strips 14 for retaining the legs of the strips against inward displacement from the vertical positions shown.

The adjacent legs of both the right and left end pair of the strips illustrated in the drawing are in abutting relation to provide mutual support against lateral displacement while the outer legs of each pair throughout the substantial portion of the height thereof contact the stabilizer bar or rib 13 as well as the ribs 11 and 12 respectively, which likewise cooperate to stabilize the structure against side-sway and lateral displacement.

The height of the legs 15 as shown in the drawing is substantially greater than the thickness of the material from which the strips 14 are formed, but due to the mutual support afforded by the strips of each contacting pair and the stabilizing effect afforded by the ribs or stabilizer members 11, 12, and 13, a structure is provided which is suitably stable against lateral deflection or shifting in directions transversely of the strips. The construction thus provides an effective depth of felt corresponding to the height of the legs 15 which may be substantially greater than the thickness of a sheet material of which the strips are formed. For any given installation, the length and height of the strips and the number thereof, and the thickness of the material employed may be varied as required for adequate support of the load to avoid densification or compression of the legs to the extent that they lose their resilience and their capacity effectually to absorb vibrations that tend to pass from the machine base or top plate 18 to the base plate 10. The interposition of the felt strips between the plate 10 and the top plate or machine base 18 provides a poor vibration transmitting medium therebetween and prevents physical contact of one plate with the other for isolating the vibrations transmitted from the machine to the plate 18, and prevents transmission of the same to the plate 10 and thence to the floor or foundation upon which the latter rests and to which it is secured.

Figure 2:
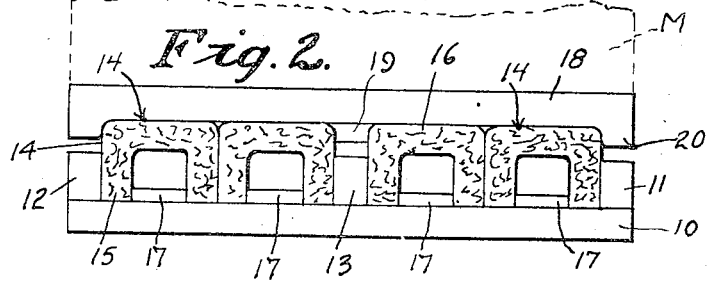
Fig. 2 is a similar view illustrating the structure with the upper plate or machine base in supported position.
Figure 3:
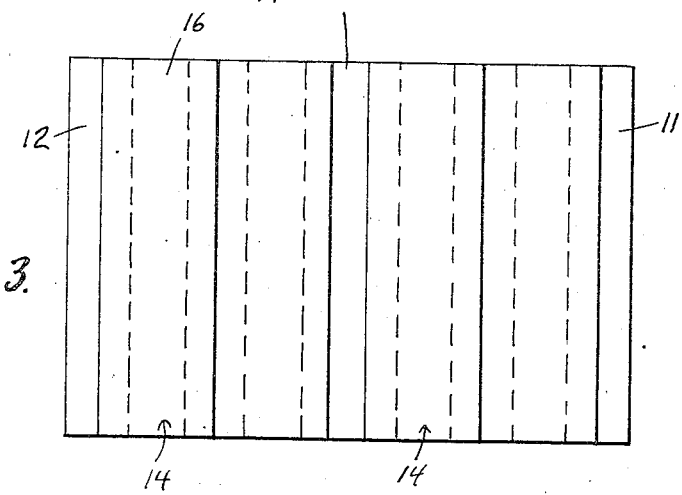
Fig. 3 is a top plan view of the structure shown in Fig. 2, with the top plate or machine base removed.

When the machine to be supported (which is represented in Fig. 2 of the drawing by the reference character M) is placed upon the insulating structure, the bowed or arched portions 16 of the strips are flattened an extent depending upon the imposed load, as, for example, to the horizontal relation shown in Fig. 2. The strips being bent initially to the arched form shown in Fig. 1 are thereby placed under stress along their intermediate portions and the resistance to downward deflection of said portions is thereby increased. This added resilience, that is, the reaction of the arches to flattening, exerts an upward component against the base 18 and adds substantially to the cushioning characteristics of the structure and improves its vibration insulating properties.

The plate or base 18 is shown provided with an intermediate depending stabilizing flange 19 and stabilizing end flanges 20 corresponding generally in function to the stabilization ribs 11, 12, and 13 but spaced adequately therefrom in a vertical direction to avoid physical contact therewith. The members 19 and 20 confine the upper ends of the strips against lateral separation and prevent displacement of the plate 18 whereby the entire load upon the plate 18 is distributed over the total area of the upper surfaces of the strips and is transmitted uniformly by the latter to the legs 15, which are of sufficient height and thickness to resist densification to the point where they cannot further be compressed when subjected to the vibrations incident to the operation of the machine. An effectually stabilized and effective vibration isolating structure is thus provided by the improved construction, which utilizes the cushioning capacity of all the felt employed by reason of which the quantity thereof may be substantially less than where felt is employed in horizontal sheets.

The term "felt" is employed generically to designate sheets of material of sound and vibration absorbing or cushioning characteristics and may be of wool, fur, hair, or of other appropriate fibers, although non-fibrous sheets of resilient material may be employed to advantage in accordance with the present improvements.

For the purpose of positively preventing creeping of the base 18 in the direction of the strips 16, the base may have depending flanges (not shown) along the unflanged edges thereof similar to flanges 20 or similar to flanges 11 and 12 of base 10, which latter likewise may be provided with similar flanges along the unflanged edges thereof, if desired.

While an embodiment of the improvements has been shown and described for illustrative purposes, variations in the particular structure illustrated may be utilized without departing from the spirit of the invention.

I claim:

1. A vibration absorbing structure comprising a pair of spaced apart upper and lower plates, said lower plate being provided with spacer members on the upper surface thereof, upstanding stabilizer members on the lower plate disposed parallel with said spacer members, depending parallel stabilizer members on said upper plate each arranged in the respective vertical plane of one of said upstanding stabilizer members on the lower plate, and a plurality of flexible inverted U-shaped vibration absorbing strips each having vertical legs resting on said lower plate on opposite sides of one of said spacer members and each strip contacting at one vertical side of one leg thereof one of said stabilizer members of each plate and at the opposite vertical side having mutual supporting contact with an adjacent side of another of said strips, said strips supporting said upper plate at an elevation above the lower plate to preclude contact of the upper stabilizing members with the respective lower stabilizing members when said upper plate is subjected to the influence of a vibration generating load supported by said upper plate.

2. A vibration absorbing structure comprising a pair of upper and lower plates, said lower plate being provided with spaced apart upstanding parallel stabilizer members extending longitudinally of the plate, said upper plate being provided with depending parallel stabilizer members each disposed in the vertical plane of one of said stabilizer members on the lower plate, and a group of longitudinally disposed vibration absorbing members in parallel relation on said lower plate each provided with a pair of parallel legs contacting one of said plates and having an initially bowed portion integral with said legs and contacting said other plate, said upper and lower stabilizer members laterally embracing the respective upper and lower portions of certain of said absorbing members for confining each member in lateral contact with an adjacent member and cooperating with said confined absorbing members to inhibit side-sway of the structure, said vibration absorbing members being of sufficient height to preclude contact of the upper and lower stabilizer members under the influence of a vibration generating load supported by the upper plate.

3. A vibration absorbing structure comprising a pair of upper and lower plates, said lower plate having a pair of spaced apart parallel upstanding stabilizer flanges, said upper plate being provided with a pair of depending parallel stabilizer flanges each disposed in the plane of one of said lower flanges, and a group of vibration absorbing members each comprising a pair of vertical legs contacting one of said plates and a portion integral with said legs contacting the other plate, said vibration absorbing members being telescopically received between said flanges of the upper and lower plates and being confined by said flanges in mutually contacting relation for inhibiting side-sway of the structure, said legs having a vertical height and resistance to compression such as to preclude contact of the flanges of the upper plate with the respective flanges of the lower plate under the influence of a vibration generating load supported by said upper plate.

CARL HUSSMAN.